United States Patent [19]
Itoh

[11] Patent Number: 5,997,729
[45] Date of Patent: Dec. 7, 1999

[54] CATALYTIC CRACKING CATALYST AND METHOD FOR CRACKING A HEAVY OIL

[75] Inventor: Toshio Itoh, Sodegaura, Japan

[73] Assignees: Idemitsu Kosan Co., Ltd.; Petroleum Energy Center, both of Tokyo, Japan

[21] Appl. No.: 09/008,432

[22] Filed: Jan. 16, 1998

[51] Int. Cl.$^6$ .............................. C10G 11/05; B01J 29/06
[52] U.S. Cl. ..................... 208/120.01; 208/118; 208/119; 208/122; 502/63; 502/64; 502/68; 502/79
[58] Field of Search .................................. 502/63, 64, 68, 502/79; 208/120.01, 118, 119, 122

[56] References Cited

U.S. PATENT DOCUMENTS

| | | | |
|---|---|---|---|
| 4,086,187 | 4/1978 | Lim et al. | 502/68 |
| 5,071,806 | 12/1991 | Pecoraro | 502/68 |
| 5,221,648 | 6/1993 | Wachter | 502/68 |
| 5,569,634 | 10/1996 | Miller et al. | 502/64 |

FOREIGN PATENT DOCUMENTS

| | | | |
|---|---|---|---|
| 2-298351 | 12/1990 | Japan | 502/68 |

*Primary Examiner*—Thomas Dunn
*Attorney, Agent, or Firm*—Antonelli, Terry, Stout & Kraus, LLP

[57] ABSTRACT

A catalytic cracking catalyst, which comprises (1) a zeolite, (2) a silica•alumina or an alumina and (3) a kaolin, has a pore diameter distribution having a peak at a pore diameter of 450 to 3,000 Å, and has 40 to 75% of a pore volume of pores of not less than 200 Å and less than 2,000 Å in pore diameter and 5 to 45% of a pore volume of pores of not less than 2,000 Å and less than 18,000 Å in pore diameter, both based on a pore volume of pores of 40 to 18,000 Å in pore diameter.

19 Claims, No Drawings

CATALYTIC CRACKING CATALYST AND METHOD FOR CRACKING A HEAVY OIL

BACKGROUND OF THE INVENTION (a) Field of the Invention

The present invention relates to a catalytic cracking catalyst useful for catalytic cracking heavy oils, methods of production thereof, and a method of catalytic cracking of heavy oil using the catalytic cracking catalyst.

(b) Description of the Related Art

In these days of increasingly heavier heavy oils and increasing demands for white oils (gasoline, kerosene and diesel fuel) rather than heavy oils, catalytic cracking of heavy oils has becoming very important. This has caused a demand for improved catalytic cracking catalysts which increase the yields of gasoline and LCO (light oil fractions).

To crack tower bottoms of heavy oils, such as desulfurized heavy oils, large pores of catalytic cracking catalysts should be increased to allow easy penetration of the tower bottoms into the catalysts to cause initial rough cracking. The products of the rough cracking are then further cracked by zeolites contained in the catalysts, to form light distillates including gasoline and LCO.

Without large pores, catalysts cannot allow raw materials of large molecules to penetrate therein and cannot work effectively, so that the yields of products of low economical value, such as coke and heavy oils, are increased.

Therefore, it is necessary to crack the tower bottoms of heavy oils in pores of different sizes in steps, first in pores of 2,000 to 18,000 Å and then in pores of 200 to 2,000 Å.

Some of the literature refers to the sizes of pores of catalytic cracking catalysts. Japanese Patent Application Unexamined Publication No. 6-25675 (1994) discloses meso-porous cracking catalysts, which, however, have a pore distribution with a peak around 150 to 350 Å, and cannot crack tower bottoms of heavy oils to give sufficiently high yields of gasoline and LCO. Japanese Patent Application Unexamined Publication No. 2-298351 (1990) refers to pore distribution of catalytic cracking catalysts, but does not clarify the amount of large pores and the forms of pores. Further, it does not disclose the production of catalysts using silica alumina or alumina which has a sharp pore diameter peak. Japanese Patent Application Unexamined Publication No. 55-109446 (1980) discloses forming pores of about 100 to 275 Å in diameter by decomposing organic polymers which are mixed into the raw materials of catalysts. Such pores, however, cannot crack the tower bottoms of heavy oils sufficiently to increase gasoline and LCO yields.

SUMMARY OF THE INVENTION

An object of the present invention is to provide a catalytic cracking catalyst and methods of the production thereof, which can catalytically crack heavy oils, such as desulfurized heavy oil, and give high yields of gasoline and LCO and low yields of coke and gas fractions.

Another object of the present invention is to provide a method of catalytic cracking heavy oils using the catalytic cracking catalyst, which gives high yields of gasoline and LCO and low yields of coke and gas fractions.

As a result of our study to solve the above problems, we have found that the yields of gasoline and LCO can be increased, with the yields of coke and gas decreased, by catalytically cracking heavy oils using catalytic cracking catalysts which comprise zeolite, silica•alumina or alumina and kaolin, have a pore diameter distribution having a peak within a specific range and have specific volume percentages of pores with diameters of specific ranges. On the basis of the finding, we have complete the present invention.

That is, the present invention provides a catalytic cracking catalyst, which comprises (1) a zeolite, (2) a silic•alumina or an alumina and (3) a kaolin, has a pore diameter distribution having a peak at a pore diameter of 450 to 3,000 Å, and has 40 to 75% of a pore volume of pores of not less than 200 Å and less than 2,000 Å in pore diameter and 5 to 45% of a pore volume of pores of not less than 2,000 Å and less than 18,000 Å in pore diameter, both based on a pore volume of pores of 40 to 18,000 Å in pore diameter.

Catalytic cracking catalysts having such specific pores can be produced, for example, by a method which comprises spray-drying a slurry containing (a) a zeolite, (b) a silica•alumina gel or an alumina gel and (c) a kaolin, or spray-drying the slurry and then calcining, wherein the (b) silica•alumina gel or the (b) alumina gel has a silica/alumina ration of 0/100 to 80/20 (wt/wt), and, when calcined by itself, gives a calcined product which has a pore diameter distribution having a peak of a height $\Delta V/\Delta \log D$, wherein $\Delta V$ is a pore volume (cc/g) at the peak and $\Delta \log D$ is a pore diameter ($\mu$m) at the peak, at a pore diameter of 50 to 600 Å.

0.0030 to 0.0130 cc/g·$\mu$m Å being a value of the height $\Delta V/\Delta \log D$ of the peak divided by 350 Å, and wherein the (b) silica•alumina gel or the (b) alumina gel is used in such an amount that when the catalytic cracking catalyst is calcined to give a calcined product, the calcined product contains 2 to 50 wt % of a silica•alumina or an alumina which is derived from the (b) silica•alumina gel or the (b) alumina gel, respectively.

Such catalytic cracking catalysts may also be produced by a method which comprises spray-drying a slurry containing (a) a zeolite, (b') a silica•alumina which is obtained by calcining a silica•alumina gel, or an alumina which is obtained by calcining an alumina gel, and (c) a kaolin, or spray-drying the slurry and then calcining, wherein the silica•alumina gel or the alumina gel has a silica/alumina ratio of 0/100 to 80/20 (wt/wt), and, when calcined by itself, gives a calcined product which has a pore diameter distribution having a peak of a height $\Delta V/\Delta \log D$, wherein $\Delta V$ is a pore volume (cc/g) at the peak and $\Delta \log D$ is a pore diameter ($\mu$m) at the peak, at a pore diameter of 50 to 600 Å, 0.0030 to 0.0130 cc/g·$\mu$m Å being a value of the height $\Delta V/\Delta \log D$ of the peak divided by 350 Å, and wherein the silica•alumina gel or the alumina gel is used in such an amount that when the catalytic cracking catalyst is calcined to give a calcined product, the calcined product contains 2 to 50 wt % of a silica•alumina or an alumina which is derived from the silica•alumina gel or the alumina gel, respectively.

Herein, the silica•alumina or the alumina derived from the silica•alumina gel or the alumina gel, respectively, means only the silica•alumina derived from the starting silica•alumina gel or the alumina derived from the starting alumina gel, and does not include other silica•alumina or other alumina derived from other components, such as zeolites.

The present invention also provides a method of catalytically cracking a heavy oil, which comprises catalytically cracking a heavy oil using the above described catalytic cracking catalyst.

DESCRIPTION OF THE PREFERRED EMBODIMENTS

Raw materials of the silica•alumina gel or the alumina gel, which is used in the methods of the present invention and is to be a matrix of the catalytic cracking catalysts of the present invention, include a silica source, such as JIS No. 3 water glass, silica sol or colloidal silica, and an alumina source, such as aluminum sulfate or sodium aluminate. For example, the production of the silica•alumina gel or the alumina gel from these raw materials may be performed as follows.

The raw materials are used as solutions, the pH of which is controlled with a pH controlling agent, for example, an acidic agent, such as nitric acid, acetic acid, hydrochloric acid or sulfuric acid, or a basic agent, such as ammonia, sodium hydroxide, sodium carbonate or sodium hydrogen carbonate.

The silica•alumina gel or the alumina gel has a silica/alumina ratio of 0/100 to 80/20 (wt/wt), preferably 0/100 to 70/30 (wt/wt), more preferably 10/90 to 70/30 (wt/wt). Catalysts containing an excess of silica cannot have large pores in silica•alumina matrix, and cannot permit penetration of heavy oils into pores.

The following is an example of the preparation of a silica•alumina gel. JIS No. 3 water glass (content of silica as $SiO_2$: 28 wt %) is diluted with ion-exchanged water to give an aqueous solution of 4.0 to 12.0 wt % concentration of $SiO_2$. Aluminum sulfate tetradecahydrate is dissolved in ion-exchanged water to give an aqueous solution of an aluminum sulfate concentration of 4.0 to 12.0 wt %.

The aqueous water glass solution and the aqueous aluminum sulfate solution are added alternately to ion-exchanged water at room temperature by portions of the same amount for 1 to 11 times. When the aqueous water glass solution is added, the solution mixture is adjusted to pH 10 or above. The above-described pH controlling agent, such as ammonia or sodium hydroxide, may be added according to demand. When the aqueous aluminum sulfate solution is added, the solution mixture is adjusted to pH 4 to 8. The above-described acidic agent or basic agent may be added according to demand.

After the completion of the reaction, precipitate is filtered off, dispersed and diffused into an aqueous ammonium nitrate solution or ion-exchanged water and filtered off again, to remove residual sodium. This procedure is repeated for three to six times, and then the resulting filtered cake is washed with ion-exchanged water. For the production of catalytic cracking catalysts, the filtered cake (silica•alumina gel or alumina gel) containing water may be used as it is, or after drying at 60 to 200° C. for 1 to 12 hours followed optionally by calcination at 300 to 900° C. for 1 to 12 hours. Before the production of catalysts, the cake, the dried product or the dried and calcined product is preferably ground to an average particle size of 0.2 to 5 μm.

When calcined under the above conditions, the silica•alumina gel or the alumina gel to be used in the method of the present invention should have a pore diameter distribution having a peak at 50 to 600 Å, preferably at 50 to 500 Å. When the pore diameter distribution of the filtered cake calcined at 800° C. for 3 hours is determined with a porosimeter, a sharp peak is observed at 50 to 600 Å, generally 100 to 600 Å. Pore diameter distribution is determined by using a mercury porosimeter at a contact angle of mercury of 130° within a pore diameter range of 40 Å to 18,000 Å.

Further, when the height of the above-described peak of the pore diameter distribution is $\Delta V/\Delta \log D$, wherein $\Delta V$ is a pore volume (cc/g) at the peak and $\Delta \log D$ is a pore diameter (μm) at the peak, the value of $\Delta V/\Delta \log D$ divided by 350 Å should be 0.0030 to 0.0130 cc/g·μmΔ. Silica•alumina gels or alumina gels which do not satisfy these conditions cannot give the catalytic cracking catalysts of the present invention.

According to the methods of the present invention, a zeolite, the silica•alumina gel or alumina gel obtained as above and a kaolin, or a zeolite, a silica•alumina or alumina, which is obtained by calcining the silica•alumina gel or alumina gel obtained as above, and a kaolin, are mixed with ion-exchanged water, to form a slurry with a solid concentration of preferably 5 to 25 wt %. A binder, such as silica sol or alumina sol, may optionally be added. It is also desirable to grind the zeolite and the kaolin to 0.2 to 5 μm prior to the mixing.

The amounts of the raw materials are such that the product catalysts contain preferably 5 to 50 wt %, more preferably 10 to 40 wt %, of a zeolite, 2 to 50 wt %, preferably 5 to 30 wt %, of a silica•alumina or an alumina derived from the silica•alumina gel or the alumina gel, preferably 10 to 50 wt %, more preferably 20 to 40 wt %, of a kaolin, 0 to 20 wt %, preferably 5 to 20 wt %, of a silica sol, and 0 to 20 wt %, preferably 0 to 10 wt %, of an alumina sol.

Examples of zeolites which may be used suitably include USY zeolite, REY zeolite obtainable by ion-exchanging NaY zeolite with a rare earth element, and REUSY zeolite obtainable by subjecting REY zeolite to steaming or the like. Preferred zeolites generally have a total specific surface area of 300 to 1,000 m$^2$/g, preferably 400 to 900 m$^2$/g.

If the content of the silica•alumina or the alumina is less than 2 wt %, catalytic cracking catalysts cannot have large pores necessary for cracking heavy oils, and if it is more than 50 wt %, the cracking sites (of zeolite) for finely cracking the roughly cracked material oils into gasoline and LCO will be decreased, and objective products cannot be obtained.

The slurry is preferably adjusted to pH 3–9.

The slurry thus obtained is spray-dried by a common method, to give catalyst particles of 30 to 120 μm in diameter, which are then dried at 80 to 200° C., followed optionally by calcination at 300 to 900° C. for 1 to 12 hours, to obtain the objective catalytic cracking catalyst.

The catalytic cracking catalyst thus obtained may optionally be further treated, for example, steamed.

Catalytic cracking catalysts obtainable by the above methods have a pore diameter distribution having a peak at a pore diameter of 450 to 3,000 Å, preferably 450 to 2,000 Å, and have 40 to 75% of a pore volume of pores of not less than 200 Å and less than 2,000 Å in pore diameter and 5 to 45% of a pore volume of pores of not less than 2,000 Å and less than 18,000 Å in pore diameter, both based on a pore volume of pores of 40 to 18,000 Å in pore diameter. When employed for catalytically cracking heavy oils, the catalytic cracking catalysts are excellent in giving high yields of gasoline and LCO and low yields of coke and gas fractions.

Whether the catalytic cracking catalysts have the above-described pore diameter distribution at the time of actual use can be confirmed easily by a preparatory experiment or the like. For example, such confirmation can be performed by allowing a catalyst sample to come to quasi equilibrium in a laboratory under appropriate conditions corresponding to those of actual processes, and then determining the pore diameter distribution of the treated catalyst sample. According to a preferred method to precisely predict and confirm such characteristics in a laboratory, 100 g of a catalyst sample is calcined at 800° C. for 3 hours and then steamed for 6 hours at 760° C. under the conditions of a steam concentration of 98 vol %, an air concentration of 2 vol %, a feed rate of ion-exchanged water of 0.42 g/min and a superficial linear velocity in a column of 2.0 cm/sec, and the pore diameter distribution of the resulting quasi equilibrium catalyst is determined.

Heavy oils which may be catalytically cracked by using the catalytic cracking catalysts of the present invention are any ones, such as desulfurized heavy oil or non-desulfurized heavy oil. The catalytic cracking is preferably carried out at a reaction temperature of 450 to 550° C. at a catalyst/raw material oil ratio of 3 to 10 (wt/wt).

Reaction apparatuses and reaction systems which may be applicable for the catalytic cracking catalysts of the present invention can be selected from known ones which have been commonly employed for the catalytic cracking of heavy oils. Practically, the catalytic cracking can be carried out by employing various apparatuses and systems, for example, those for fixed bed type processes, moving bed type processes and fluidized bed type processes (FCC, RFCC).

Hereinafter, the present invention will be described referring to Examples and Comparative Examples, which however do not limit the scope of the present invention.

EXAMPLES 1 TO 8 AND COMPARATIVE EXAMPLES 1 TO 6

Example 1

(1) Preparation of a silica•alumina Gel (silica/alumina=50 wt/50 wt, peak of pore diameter distribution: 300 Å)

JIS No. 3 water glass was diluted with ion-exchanged water to give an 8.0 wt % aqueous solution as determined as the concentration of $SiO_2$. Aluminum sulfate tetradecahydrate (produced by Wako Jun-yaku Co., Ltd.) was dissolved into ion-exchanged water to give an 8.0 wt % aqueous solution.

Into a 5-liter glass vessel was added one liter of ion-exchanged water. While the ion-exchanged water was stirred with an electric stirrer, the aqueous water glass solution and the aqueous aluminum sulfate solution were added alternately thereto each by 100 ml portions for three times, to prepare a silica•alumina gel. When the aqueous water glass solution was added, the mixture was adjusted to pH 10, and when the aqueous aluminum sulfate solution was added, the mixture was adjusted to pH 8 by addition of 5 wt % aqueous ammonia.

After the resulting mixture was adjusted to pH 8, the reaction product was filtered off to obtain a crude silica•alumina gel as a filtered cake. The filtered cake was dispersed in 1 liter of 1 wt % aqueous ammonium nitrate solution added thereto, to remove the sodium contained in the filtered cake by ion-exchanging it with ammonium nitrate. After this procedure was repeated four times, the filtered cake was washed with ion-exchanged water and filtered off, to obtain a washed silica•alumina gel. When the washed silica•alumina gel was dried at 80° C. for 6 hours and then calcined at 800° C. for 3 hours, the calcined product had a pore diameter distribution having a peak at 300 Å. Other properties are shown in Table 1.

The pore diameter measurements were carried out with a porosimeter (AUTOPORE II 9220, PRODUCED BY Micro Meritix Co., Ltd.), to determine the pore diameter distribution ranging from 40 Å to 18,000 Å at a contact angle of mercury of 130° and at a surface tension of mercury of 484 dyn/cm. Then the height of the peak of the pore diameter $\Delta V/\Delta \log D$ ($\Delta V$ is the pore volume (cc/g) at the peak and $\Delta \log D$ is the pore diameter ($\mu$m) at the peak) was calculated.

(2) Preparation of a Catalytic Cracking Catalyst 10 wt % (based on the weight after calcination; the same shall apply hereinafter) of the silica•alumina gel obtained above, 30 wt % of USY zeolite (Trade name: HSZ-330HUA, produced by Toso Co., Ltd.), 40 wt % of kaolin (trade name: ASP-170, produced by Tsuchiya Kaolin Kogyo Co., Ltd.) and 10 wt % of silica sol were added to ion-exchanged water, to give a slurry. The silica•alumina gel, the zeolite and the kaolin had been previously ground to an average particle diameter of 0.9 $\mu$m.

The slurry was adjusted to pH 4 or less by addition of concentrated nitric acid, and 10 wt % of alumina sol was added thereto to give a slurry of a solid concentration of 15 wt %. The slurry was spray-dried at 250° C. with a spray-dryer at a rotational speed of the disc of the spray-dryer of 9,000 rpm and at a feed rate of the slurry of 10 cc/min, to obtain a spherical catalytic cracking catalyst of 20 to 120 $\mu$m in particle diameter.

(3) Catalyst Pretreatment and Evaluation of Catalytic Reactivity with an MAT apparatus (a Micro Activity Testing apparatus, ASTM MAT D3907 Evaluation Method for Petroleum Hydrocarbon Catalytic Cracking Activities of Catalysts)

100 g of the catalyst produced as above was calcined at 800° C. for 3 hours, and then steamed at 760° C. for 6 hours at a steam concentration of 98 vol %, at an air concentration of 2 vol %, and at a feed rate of ion-exchanged water of 0.42 g/min. After these pretreatments, the pore diameter distribution of the catalyst was determined with a porosimeter (AUTOPORE II 9220, produced by Micro Meritix Co., Ltd.) at a contact angle of mercury of 130° at a surface tension of mercury of 484 dyn/cm.

The reactivity evaluation with the MAT apparatus was carried out by using an Arabian light desulfurized heavy oil as a raw material oil, under the conditions of a catalyst amount of 5 g and a reaction temperature of 550° C.

Example 2

The procedure of Example 1 was repeated with the exceptions that in step (2) (Preparation of a Catalytic Cracking Catalyst), the silica•alumina gel prepared in step (1) of Example 1 was dried at 80° C. for 6 hours and then calcined at 800° C. for 3 hours, and that 30 wt % of the obtained silica•alumina, 30 wt % of USY zeolite, 30 wt % of kaolin, 5 wt % of silica sol and 5 wt % of alumina sol, all of which had been previously ground to an average particle diameter of 0.9 $\mu$m, were used to prepare a catalytic cracking catalyst.

Example 3

The same aqueous water glass solution and aqueous aluminum sulfate solution as those prepared in Example 1 were used. Into a 5-liter vessel containing 1 liter of ion-exchanged water were added 300 ml of the aqueous water glass solution and 300 ml of the aqueous aluminum sulfate solution in sequence, and the mixture was then adjusted to pH 8, to give a crude silica•alumina gel. Thereafter, the same procedure as in step (1) of Example 1 was repeated. When the washed silica•alumina gel prepared in this example was calcined, the calcined product had a pore diameter distribution having a peak at 100 Å.

Thereafter, steps (2) and (3) of Example 1 were repeated with the exception that the silica•alumina gel obtained as above was used in place of the silica•alumina gel prepared in Example 1.

Example 4

The same procedure as in Example 1 was repeated with the exception that in step (2) (Preparation of a Catalytic Cracking Catalyst), 5 wt % of the silica•alumina gel prepared in Example 1, 30 wt % of USY zeolite, 40 wt % of kaolin, 12.5 wt % of silica sol and 12.5 wt % of alumina sol were used to prepare a catalytic cracking catalyst.

Example 5

The procedure of Example 1 was repeated with the exception that the silica•alumina gel that was produced in Example 3 and had a pore diameter peak at 100 Å was used in place of the silica•alumina gel produced in Example 1, and the USY zeolite and the kaolin had been ground to an average particle diameter of 2 µm before the preparation of a catalytic cracking catalyst.

Example 6

Aluminum sulfate tetradecahydrate (produced by Wako Jun-yaku Co., Ltd.) was dissolved in ion-exchanged water to give an 8.0 wt % aqueous solution. Sodium aluminate (produced by Wako Jun-yaku Co., Ltd.) was dissolved in ion-exchanged water to give an 8.0 wt % aqueous solution. Into 1 liter of ion-exchanged water which was contained in a 5-liter glass vessel and stirred with an electric stirrer were added the aqueous sodium aluminate solution and the aqueous aluminum sulfate solution alternately each by 50 ml portions for six times, to prepare an alumina gel. When the aqueous sodium aluminate solution was added, the mixture was adjusted to pH 10 or above, and when the aqueous aluminum sulfate solution was added, to pH 4–5, by addition of an aqueous sodium hydroxide solution or sulfuric acid.

The obtained alumina gel was treated in the same manner as in Example 1, to obtain an alumina gel with a decreased sodium content. When the alumina gel was dried at 80° C. for 3 hours and then calcined at 800° C. for 3 hours, the calcined product had a pore diameter distribution having a peak at 500 Å.

The alumina gel was dried at 80° C. for 3 hours and then calcined at 500° C. for 3 hours to obtain alumina. The obtained alumina and the USY zeolite and the kaolin used in Example 1 were ground to an average particle diameter of 2 µm. 10 wt % of the alumina, 30 wt % of the USY zeolite, 40 wt % of the kaolin and 20 wt % of silica sol were added to ion-exchanged water, to give a slurry. Then the same procedure as in Example 1 was repeated to produce a catalytic cracking catalyst and to carry out pretreatments of the catalyst, pore diameter distribution measurements and reactivity evaluation with a MAT apparatus.

Example 7

A spherical alumina (produced by Kaiser AG), which had a pore size distribution having a peak at 100 Å and which contained 69.2 wt % of Al$_2$O$_3$, was ground to an average particle diameter of 2 µm.

Then a catalytic cracking catalyst was produced in the same manner as in step (2) of Example 1 with the exception that 15 wt % (based on the weight after calcination; the same shall apply hereinafter) of the ground alumina, 30 wt % of the same USY zeolite as that used in Example 6, 35 wt % of the same kaolin as that used in Example 6 and 20 wt % of silica sol were used.

Thereafter, step (3) of Example 1 was repeated with the exception that the catalytic cracking catalyst produced as above was used in place of the catalytic cracking catalyst produced in Example 1.

Example 8

The same aqueous water glass solution and aqueous aluminum sulfate solution as those prepared in Example 1 were used. Into a 10-liter vessel containing 1 liter of ion-exchanged water were added the aqueous water glass solution and the aqueous aluminum sulfate solution alternately each by 50 ml portions for 8 times, to give a crude silica•alumina gel.

When the aqueous water glass solution was added, the mixture was adjusted to pH 10 or above, and when the aqueous aluminum sulfate was added, to pH 8, by addition of a 5 wt % aqueous sodium hydroxide solution. Then the same procedure as in Example 1 was repeated. When the obtained silica•alumina gel was calcined, the calcined product had a pore diameter distribution having a peak at 600 Å.

Then a catalytic cracking catalyst was produced in the same manner as step (2) of Example 1, with the exception that the silica•alumina gel obtained as above, zeolite and kaolin which were ground to an average particle diameter of 2.2 µm were used.

Thereafter, step (3) of Example 1 was repeated with the exception that the catalytic cracking catalyst produced as above was used in place of the catalytic cracking catalyst produced in Example 1.

Comparative Example 1

A catalytic cracking catalyst was produced in the same manner as step (2) of Example 1 with the exception that the silica•alumina gel used in Example 1 was not used, but 30 wt % of the USY zeolite, 40 wt % of the kaolin, 20 wt % of the silica sol and 10 wt % of the alumina sol were used. Then step (3) of Example 1 was repeated with the exception that the catalytic cracking catalyst produced as above was used in place of the catalytic cracking catalyst produced in Example 1.

Comparative Example 2

A catalytic cracking catalyst was produced in the same manner as step (2) of Example 1 with the exception that 40 wt % of the silica•alumina gel produced in Example 1, 30 wt % of the USY zeolite, 20 wt % of the kaolin, 5 wt % of the silica sol and 5 wt % of the alumina sol were used, and then reactivity evaluation was carried out in the same manner as step (3) of Example 1.

Comparative Example 3

Into a 5-liter beaker was placed 1 liter of ion-exchanged water, and 300 ml of the aqueous water glass solution and 300 ml of the aqueous aluminum sulfate solution, which were prepared in Example 1, were added thereto simultaneously with continuous stirring, to prepare a crude silica•alumina gel. The crude silica•alumina gel was washed in the same manner as in Example 1. When the washed silica•alumina gel was dried at 80° C. for 3 hours and then calcined at 800° C. for 3 hours, the calcined product had a pore diameter distribution having a peak at 30 Å.

A catalytic cracking catalyst was produced in the same manner as step (2) of Example 1 with the exception that the silica•alumina gel prepared above was used in place of the silica•alumina gel prepared in Example 1.

Thereafter, step (3) of Example 1 was repeated with the exception that the catalytic cracking catalyst produced as above was used in place of the catalytic cracking catalyst produced in Example 1.

Comparative Example 4

Into a 5-liter beaker was placed 1 liter of ion-exchanged water, and the aqueous glass water solution and the aqueous aluminum sulfate solution which were prepared in Example 1 were poured thereto alternately each by 50 ml portions for 8 times, to prepare a crude silica•alumina gel. Then the same procedure as in Example 1 was repeated. When the crude silica•alumina gel was washed, dried and calcined in the same manner as in Example 1, the calcined product had a pore diameter distribution having a peak at 500 Å.

A catalytic cracking catalyst was produced in the same manner as step (2) of Example 1 with the exceptions that the washed silica•alumina gel obtained above was used in place of the silica•alumina gel prepared in Example 1, and that the USY zeolite and the kaolin, which were the same as those used in Example 1, were ground to an average particle diameter of 6 $\mu$m before mixing.

Thereafter, step (3) of Example 1 was repeated with the exception that the catalytic cracking catalyst produced as above was used in place of the catalytic cracking catalyst produced in Example 1.

Comparative Example 5

An aqueous water glass solution and an aqueous aluminum sulfate solution which were the same as those prepared in Example 1 were used. Into a 10-liter vessel containing 1 liter of ion-exchanged water were added the aqueous water glass solution and the aqueous aluminum sulfate solution alternately each by 50 ml portions for 8 times, to prepare a crude silica•alumina gel. When the aqueous water glass solution was added, the mixture was adjusted to pH 10 or above, and when the aqueous aluminum sulfate solution was added, to pH 8, by addition of 5 wt % aqueous ammonia. Then the same procedure as in Example 1 was repeated to prepare a washed silica•alumina gel. When the washed silica•alumina gel was dried and calcined in the same manner as in Example 1, the calcined product had a pore diameter distribution having a peak at 600 Å. Thereafter a catalytic cracking catalyst was produced and reactivity evaluation was carried out in the same manner as steps (2) and (3) of Example 1 with the exception that the silica•alumina gel prepared as above was used in place of the silica•alumina gel prepared in Example 1.

Comparative Example 6

An aqueous water glass solution and an aqueous aluminum sulfate solution which were the same as those prepared in Example 1 were used. Into a 10-liter vessel containing 1 liter of ion-exchanged water were added the aqueous water glass solution and the aqueous aluminum sulfate solution alternately each by 50 ml portions for 10 times, to prepare a crude silica•alumina gel.

When the aqueous water glass solution was added, the mixture was adjusted to pH 10 or above, and when the aqueous aluminum sulfate solution was added, to pH 8, by addition of 5 wt % aqueous ammonia. Then the same procedure as in Example 1 was repeated to prepare a washed silica•alumina gel. When the washed silica•alumina gel was dried and calcined in the same manner as in Example 1, the calcined product had a pore diameter distribution having a peak at 700 Å.

Thereafter, a catalytic cracking catalyst was produced in the same manner as step (2) of Example 1 with the exceptions that the silica•alumina gel prepared as above was used in place of the silica•alumina gel prepared in Example 1, and that the zeolite and the kaolin were ground to an average particle diameter of 2.9 $\mu$m before mixing.

Then step (3) of Example 1 was repeated with the exception that the catalytic cracking catalyst produced as above was used in place of the catalytic cracking catalyst produced in Example 1.

TABLE 1

|  | Example Nos. | | | | | | | |
| --- | --- | --- | --- | --- | --- | --- | --- | --- |
|  | 1 | 2 | 3 | 4 | 5 | 6 | 7 | 8 |
| Pore diameter where the pore diameter distribution of a calcined product of a silica·alumina gel or a silica·alumina has a peak (Å) | 300 | 300 | 100 | 300 | 100 | 500 | 100 | 600 |
| ($\Delta$V/$\Delta$logD)/350 Å (cc/g·$\mu$mÅ) | 0.009 | 0.009 | 0.004 | 0.009 | 0.004 | 0.005 | 0.010 | 0.007 |
| Content of silica·alumina (wt %) | 10 | 30 | 10 | 5 | 10 | 15 | 20 | 10 |
| Catalyst | | | | | | | | |
| Pore diameter where a pore diameter distribution has a main peak | 700 | 700 | 600 | 500 | 1700 | 2000 | 1800 | 1800 |
| Volume percentage of catalyst pores | | | | | | | | |
| not less than 200 Å and less than 2000 Å | 57.2 | 71.9 | 60.9 | 65.8 | 57.0 | 47.0 | 46.2 | 45.3 |
| not less than 2000 Å and less than 18000 Å | 17.3 | 9.6 | 5.7 | 6.6 | 27.8 | 29.1 | 39.0 | 43.0 |
| MAT reaction results | | | | | | | | |
| Gas (C1–C4) (wt %) | 21.8 | 22.4 | 22.0 | 22.3 | 21.7 | 21.9 | 22.6 | 22.1 |
| FG + LCO (wt %) | 63.7 | 62.7 | 63.5 | 62.7 | 64.2 | 63.4 | 64.1 | 63.3 |
| Coke (wt %) | 6.9 | 6.9 | 7.0 | 7.4 | 6.7 | 7.3 | 7.5 | 7.2 |

TABLE 2

| | Comparative Example Nos. | | | | | |
|---|---|---|---|---|---|---|
| | 1 | 2 | 3 | 4 | 5 | 6 |
| Pore diameter where the pore diameter distribution of a calcined product of a silica · alumina gel or a silica · alumina has a peak (Å) | — | 300 | 30 | 500 | 600 | 700 |
| (ΔV/ΔlogD)/350 Å (cc/g · μmÅ) | — | 0.009 | 0.002 | 0.015 | 0.002 | 0.005 |
| Content of silica · alumina (wt %) | — | 40 | 10 | 10 | 20 | 10 |
| Catalyst | | | | | | |
| Pore diameter where a pore diameter distribution has a main peak | 400 | 600 | 400 | 3500 | 700 | 2200 |
| Volume percentage of catalyst pores | | | | | | |
| not less than 200 Å and less than 2000 Å | 44.3 | 76.8 | 49.6 | 56.1 | 76.1 | 38.5 |
| not less than 2000 Å and less than 18000 Å | 15.0 | 8.8 | 11.9 | 35.0 | 12.8 | 48.0 |
| MAT reaction results | | | | | | |
| Gas (C1–C4) (wt %) | 25.4 | 24.4 | 25.4 | 24.8 | 18.5 | 19.0 |
| FG + LCO (wt %) | 57.9 | 59.0 | 57.4 | 58.3 | 56.9 | 58.8 |
| Coke (wt %) | 9.3 | 8.9 | 9.8 | 8.7 | 6.5 | 6.8 |

What is claimed is:

1. A catalytic cracking catalyst, which comprises (1) a zeolite, (2) a silica-alumina or an alumina and (3) a kaolin, wherein said catalyst has a pore diameter distribution having a peak at a pore diameter of 450 to 3,000 Å, and based on the pore volume from pores having a diameter of between 40 to 18,000 Å, 40–75% of the pore volume is from pores having a diameter of at least 200 Å but less than 2,000 Å and 5–45% of the pore volume is from pores having a diameter of at least 2,000 Å but less than 18,000 Å.

2. The catalytic cracking catalyst of claim 1, wherein said catalyst has a pore diameter distribution having a peak at a pore diameter of 450 to 2,000 Å.

3. A method of producing the catalytic cracking catalyst of claim 1, comprising spray-drying a slurry containing (a) a zeolite, (b) a silica-alumina gel or an alumina gel and (c) a kaolin, and then calcining the spray-dried slurry, wherein the silica-alumina gel or the alumina gel
has a silica/alumina weight ratio of 0/100 to 80/20, and,
when calcined by itself, gives a calcined product which has a pore diameter distribution having a peak of a height ΔV/ΔlogD, wherein ΔV is the pore volume (cc/g) at the peak and ΔlogD is the pore diameter (μm) at the peak, wherein said peak is at a pore diameter of 50 to 600 Å, and wherein the height ΔV/ΔlogD of the peak divided by 350 Å has a value of 0.0030 to 0.0130 cc/g·μm Å, and
wherein the silica-alumina gel or the alumina gel is used in such an amount that when the catalytic cracking catalyst is calcined to give a calcined product, the calcined product contains 2 to 50 wt % silica-alumina or alumina which is derived from the silica-alumina gel or the alumina gel, respectively.

4. The method of claim 3, wherein the (a) zeolite, the silica-alumina gel or the alumina gel and the (c) kaolin have been ground to 0.2 to 5 μm in diameter.

5. The method of claim 3, wherein the zeolite is a USY zeolite, a REY zeolite or a REUSY zeolite.

6. A method of producing the catalytic cracking catalyst of claim 1, comprising spray-drying a slurry containing (a) a zeolite, (b) a silica-alumina which is obtained by calcining a silica-alumina gel, or an alumina which is obtained by calcining an alumina gel, and (c) a kaolin, and then calcining the spray-dried slurry, wherein the silica-alumina gel or the alumina gel
has a silica/alumina weight ratio of 0/100 to 80/20, and,
when calcined by itself, gives a calcined product which has a pore diameter distribution having a peak of a height ΔV/ΔlogD, wherein ΔV is the pore volume (cc/g) at the peak and ΔlogD is the pore diameter (μm) at the peak, wherein said peak is at a pore diameter of 50 to 600 Å, and wherein the height ΔV/ΔlogD of the peak divided by 350 Å has a value of 0.0030 to 0.0130 cc/g·μm Å, and
wherein the silica-alumina gel or the alumina gel is used in such an amount that when the catalytic cracking catalyst is calcined to give a calcined product, the calcined product contains 2 to 50 wt % silica-alumina or alumina which is derived from the silica-alumina gel or the alumina gel, respectively.

7. The method of claim 6, wherein the (a) zeolite, the (b) silica-alumina or alumina and the (c) kaolin have been ground to 0.2 to 5 μm in diameter.

8. The method of claim 6, wherein the zeolite is a USY zeolite, a REY zeolite or a REUSY zeolite.

9. A method of catalytic cracking a heavy oil, comprising catalytically cracking a heavy oil using the catalytic cracking catalyst of claim 1.

10. The method of claim 9, wherein the catalytic cracking catalyst has a pore diameter distribution having a peak at a pore diameter of 450 to 2,000 Å.

11. The method of claim 9, wherein the heavy oil is a desulfurized heavy oil or a non-desulfurized heavy oil.

12. A method of catalytic cracking heavy oil, comprising catalytically cracking a heavy oil using the catalytic cracking catalyst produced by the method of claim 3.

13. The method of claim 12, wherein the (a) zeolite, the (b) silica-alumina gel or alumina gel and the (c) kaolin have been ground to 0.2 to 5 μm in diameter.

14. The method of claim 12, wherein the zeolite is a USY zeolite, a REY zeolite or a REUSY zeolite.

15. The method of claim 12, wherein the heavy oil is a desulfurized heavy oil or a non-desulfurized heavy oil.

16. A method of catalytic cracking a heavy oil, comprising catalytically cracking a heavy oil using the catalytic cracking catalyst produced by the method of claim 6.

17. The method of claim 16, wherein the (a) zeolite, the (b) silica-alumina or alumina and the (c) kaolin have been ground to 0.2 to 5 μm in diameter.

18. The method of claim 16, wherein the zeolite is a USY zeolite, a REY zeolite or a REUSY zeolite.

19. The method of claim 16, wherein the heavy oil is a desulfurized heavy oil or a non-desulfurized heavy oil.

* * * * *